July 18, 1944.   E. F. SCHNEDAREK   2,353,767
TIRE BUILDING DRUM
Filed Dec. 29, 1937   3 Sheets-Sheet 1

INVENTOR
Emil F. Schnedarek
BY
Evans + McCoy
ATTORNEYS

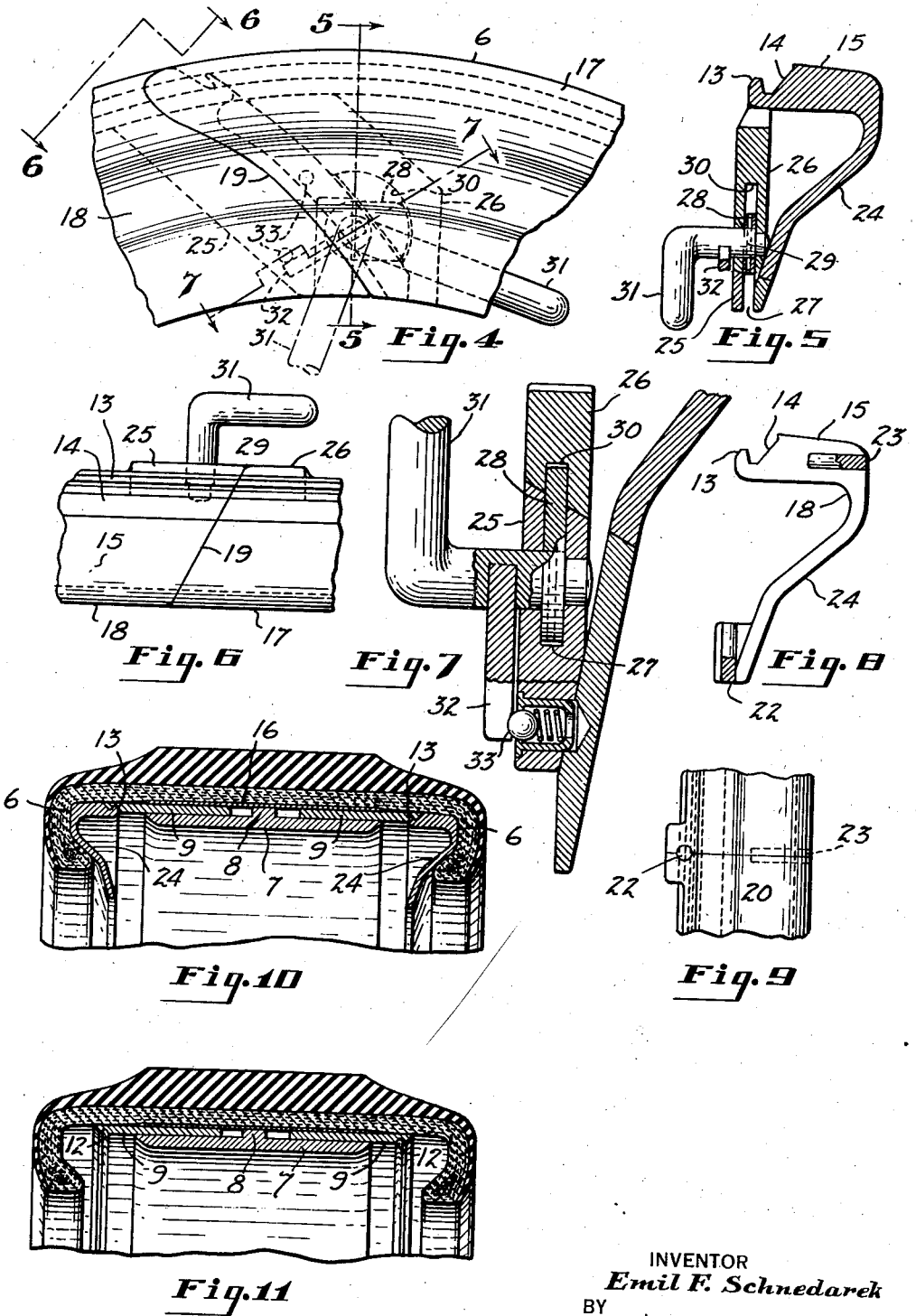

July 18, 1944.  E. F. SCHNEDAREK  2,353,767
TIRE BUILDING DRUM
Filed Dec. 29, 1937  3 Sheets-Sheet 3
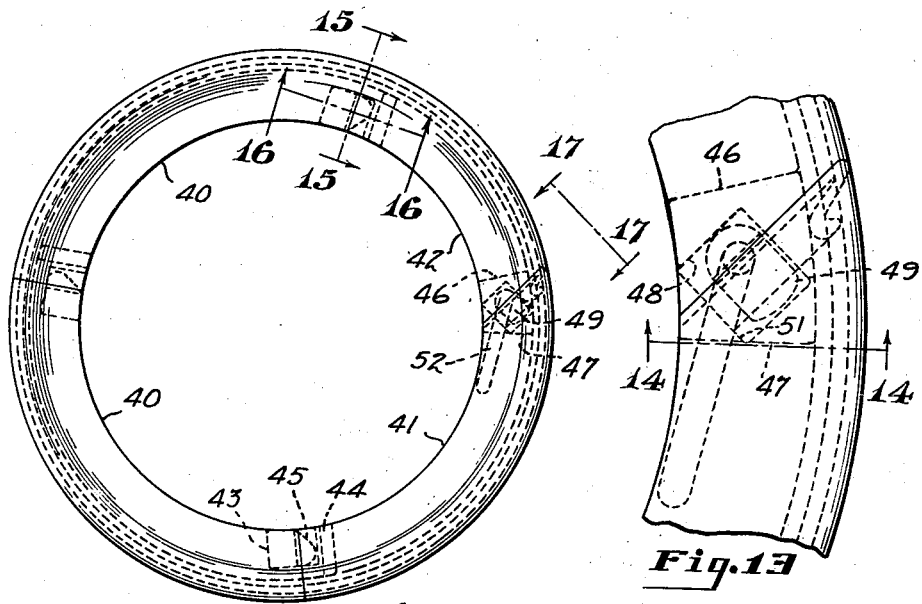
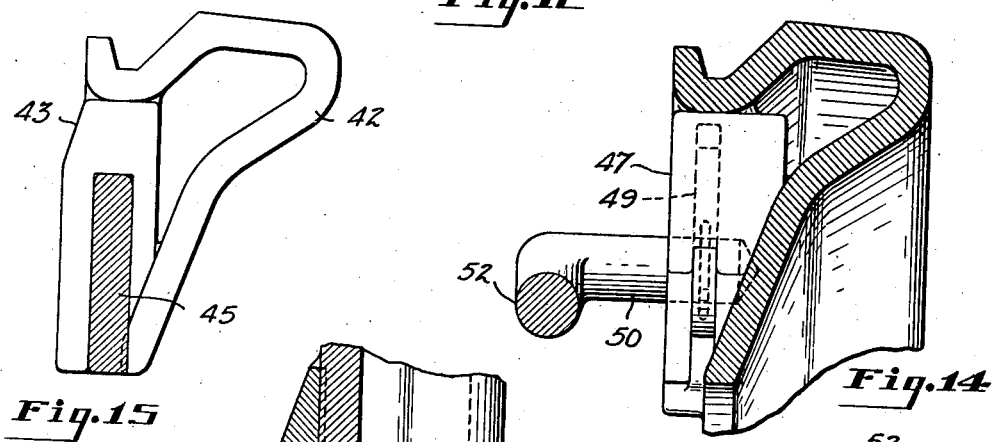
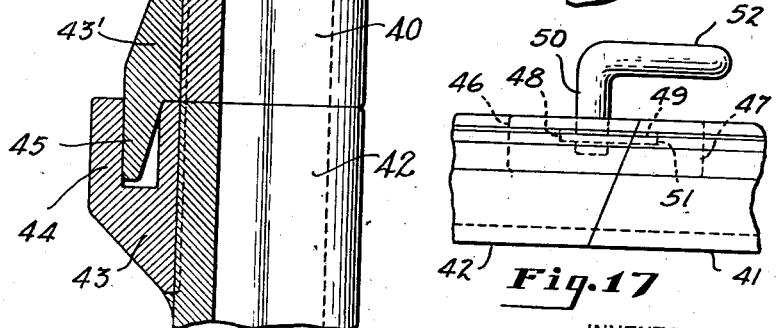
INVENTOR
*Emil F. Schnedarek*
BY
Evans + McCoy
ATTORNEYS Patented July 18, 1944

2,353,767

UNITED STATES PATENT OFFICE 2,353,767

TIRE BUILDING DRUM

Emil F. Schnedarek, Akron, Ohio, assignor, by mesne assignments, to The Akron Standard Mold Company, Akron, Ohio, a corporation of Ohio Application December 29, 1937, Serial No. 182,269

8 Claims. (Cl. 154—9)

This invention relates to tire building cores and more particularly to tire building cores of the flat band or drum type upon which the body of a tire carcass is built to substantially cylindrical form.

The present invention has for its object to provide a drum type tire building core upon which a tire carcass may be built with inextensible bead portions within the outer peripheral portion of the core and from which a tire carcass with inextensible beads so disposed may be conveniently freed from the core after the building operation.

A further object is to provide a core which is rigidly held in its annular form during the tire building operation but which can be quickly and easily removed from the interior of the tire.

A further object is to provide a tire building core of the drum type which may be adjusted to different widths for the construction of tires of different sizes.

With the above and other objects in view the invention may be said to comprise the tire building core as illustrated in the accompanying drawings hereinafter described and particularly set forth in the appended claims together with such variations thereof as will be apparent to one skilled in the art to which the invention appertains.

Reference should be had to the accompanying drawings forming a part of this specification, in which:

Fig. 4 is an enlarged fragmentary side elevation of the breakable joint of the side ring;

Fig. 5 is a section taken on the line indicated at 5—5 in Fig. 4;

Fig. 6 is a fragmentary elevation of the joint shown in Fig. 4 viewed as indicated at 6—6 in Fig. 4;

Fig. 7 is an enlarged section taken on the line indicated at 7—7 in Fig. 4;

Fig. 8 is an enlarged section taken on the line indicated at 8—8 in Fig. 2;

Fig. 9 is an enlarged fragmentary elevation of one of the joints between radially disposed ends of ring segments viewed as indicated at 9—9 in Fig. 2;

Fig. 10 is a fragmentary axial section showing a tire carcass built upon the core;

Fig. 11 is a view similar to Fig. 10 showing the side rings removed;

Fig. 12 is an end elevation of a side ring of slightly modified construction;

Fig. 13 is an enlarged fragmentary side elevation of the breakable joint of the ring shown in Fig. 12;

Fig. 14 is an enlarged section taken on the line indicated at 14—14 in Fig. 13;

Fig. 15 is an enlarged section taken on the line indicated at 15—15 of Fig. 12;

Fig. 16 is an enlarged fragmentary section taken on the line indicated at 16—16 in Fig. 12;

Fig. 17 is an enlarged fragmentary elevation of the periphery of the ring shown in Fig. 12 at the breakable joint viewed as indicated by the arrows 17—17 in Fig. 12.

Figure 1:
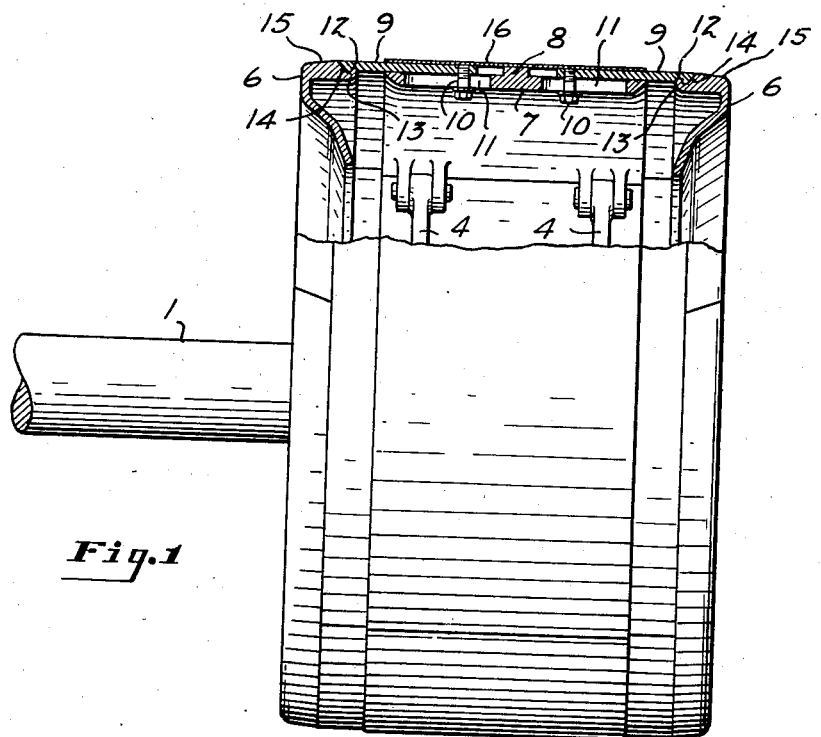
Figure 1 is a side elevation of a tire building core embodying the invention, the periphery of the core being broken away at one side and shown in section.

The tire building core of the present invention is mounted upon a suitable shaft 1 and consists of a central collapsible externally cylindrical band 2 of conventional construction composed of segments having inclined end faces 3 and supported upon arms and links 4 and 5 in the usual and conventional manner from a supporting member on the shaft 1. The supporting and collapsing means for the central band 2 is not shown in detail since the core supporting and collapsing means for the central band may be any of various arrangements for collapsing and expanding segmental tire building cores. The opposite side portions of the core are formed by separate rigid side rings 6 which have inner marginal portions underlying the central band 2 to positively hold the central band against collapse. The side rings 6 are engaged with the central band after the central band is expanded to operating position and after a tire carcass has been built on the core, the said rings 6 are removed prior to collapsing the central band 2.

Each segment of the central band 2 consists of a body portion 7 provided with a central external rib 8 and arcuate plates 9 mounted for lateral sliding movement on the body portion 7 on opposite sides of the central rib 8. The plates 9 project beyond opposite side edges of the body portion 7 and are connected to the body portion 7 by means of bolts 10 which are slidable in axial slots 11 formed in the body portion 7. The outer faces of the plates 9 are flush with the outer face of the central rib 8 to provide a band with an outer periphery of uniform diameter. By adjusting the plates 9 laterally the width of the band 2 may be varied.

Adjacent their outer side edges the plates 9 are provided on their inner faces with grooves 12. The rings 6 are provided with ribs 13 at their inner margins which fit in the grooves 12. The rings 6 have inclined shoulders 14 which engage the inclined edges of the plates 9 and outwardly of the shoulders 14 the rings 6 have cylindrical exterior face portions 15 which are flush with the outer faces of the plates 9, the central band 2 and the side rings 6 forming a core with a substantially cylindrical periphery from end to end.

A sheet metal cover 16 may be provided on the segments of the band 2, this cover plate being attached to the central ribs 8 and overlying the outer faces of the arcuate plates 9 so as to bridge the gap between the inner edges of the plates 9 and the ribs 8 in all positions of adjustment of the plates 9.

The two side rings 6 are identical in construction, one of the rings being illustrated in detail in the accompanying drawings. This ring is composed of segments which are rigidly locked together during the tire building operation but which can be taken apart and removed after the tire building operation is completed. The ring has two segments 17 and 18 provided with a breakable joint at their abutting ends, the breakable joint being between abutting faces 19 which are disposed at an angle to the axis of the core, said faces 19 being inclined with respect to radial lines to allow one of the segments to swing inwardly upon release from the other and being inclined with respect to axial lines so as to permit one of the sections to swing inwardly toward the center of the core at the same time that it is swung inwardly toward the axis of the core. At the ends thereof, opposite the inclined ends 19, the sections 17 and 18 have radially disposed end faces 20 and other segments 21 of the ring have radially disposed end faces 20 at each end thereof. The assembled ring, therefore, is composed of sections provided with ends 20 which abut in radial planes and a single breaking joint formed between the abutting end faces 19 which are disposed in a plane at an angle to the axis so that the short section 18 of the ring may be swung radially inwardly and laterally to break the ring. The radial abutting ends 20 of the ring segments are held against relative lateral movements by radial pins 22 fitting in openings formed by complemental grooves formed in the end faces 20, and against relative radial movements by axially extending pins 23 inserted between the segments adjacent the periphery of the ring. The pins 22 and 23 are welded in the groove of one segment and engage in the grooves of the abutting segment to lock the segments.

The ring segments are of angular cross-section each being provided with a flange 24 projecting radially inwardly from the peripheral portion 15 and inclined toward the longitudinal center of the core so as to provide seats for the inclined toes of the tire beads inwardly of the side edges of the core. The segments 17 and 18 of the ring at the ends thereof, provided with the inclined faces 19, have reinforcing webs 25 and 26 which bridge the space between the inner edges of the flanges 24 and the inner edges of the cylindrical peripheral portion 15 of the ring. The inclined face of the web 25 is provided with a groove 27 which houses a latch member 28 fixed to a shaft 29 journalled in the web. Upon turning of the shaft 29 the member 28 is movable from a position in which it is entirely retracted within the groove 27 to a position in which it projects into a groove 30 formed in the inclined face of the web 26. At the inner side of the ring the shaft 29 is provided with a handle 31 by means of which it may be turned to move the latch member 28 into and out of locking position. The shaft 29 is provided with an arm 32 immediately adjacent the inner face of the web 25 and this arm engages with a ball detent 33 which serves to releasably hold the latch in locking position. Upon actuation of the handle 31 the arm 32 may be forced over the detent and continued turning movement of the shaft moves the latch member 28 to retracted position.

Figures 2, 3:
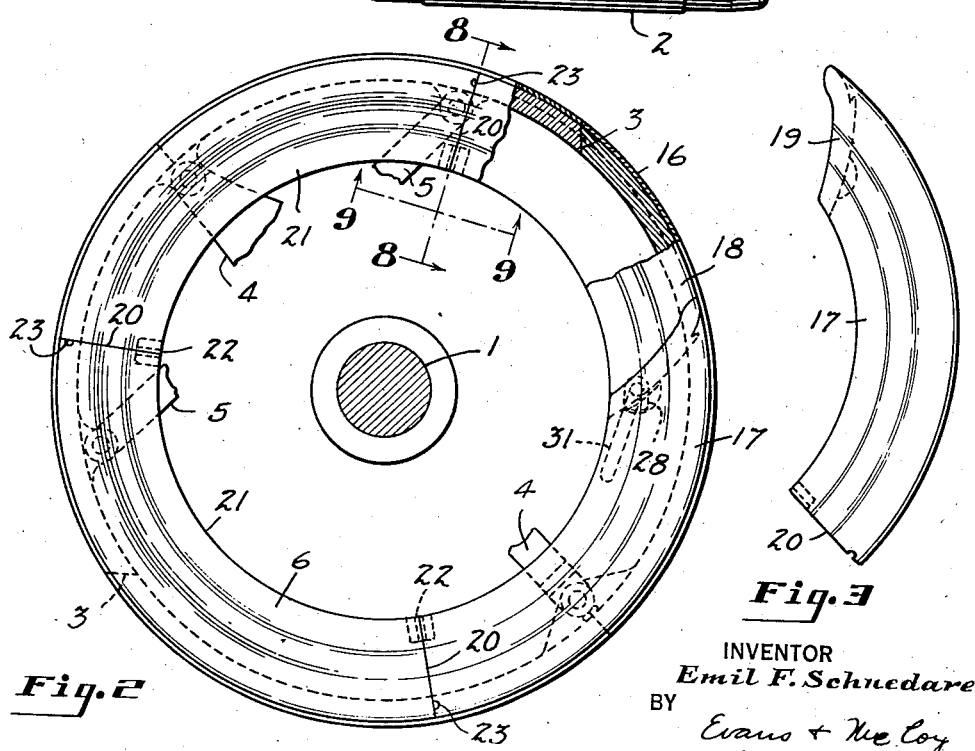
Fig. 2 is an end elevation of the tire building core with an edge broken away to show a part of the central band in section.
Fig. 3 is a side elevation of one of the side ring segments which is provided at one end with a radial face and at its opposite end with an inclined face.

When the ring segments are assembled as shown in Fig. 2, with the latch member 28 turned to locking position, the ring segments are rigidly locked together and the two side rings assembled with the central collapsible band as shown in Fig. 1 to provide a rigid support for the core. After the tire carcass has been built upon the core as shown in Fig. 10, the two side rings may be broken and removed from the interior of the carcass by operating the handles 31 to release the latch members 28, permitting the short segment 18 of each ring to be swung radially inwardly and laterally toward the center plane of the core to be removed from the interior of the tire. After the short section 18 of a ring is removed the other sections of the ring can be readily taken out and, after the removal of the rings, the central band 2 is collapsible and carries the tire carcass as shown in Fig. 11. The band 2 is narrow enough to pass readily between the tire beads and may be readily collapsed to an external diameter less than the bead diameter of the tire to permit removal of the tire.

Figs. 12 to 16 inclusive of the drawings show a side ring of slightly modified construction. The cross-sectional shape of the side ring illustrated in Figs. 12 to 16 is substantially the same as that of the ring above described, the segment locking devices, however, are of somewhat different construction. As shown in Fig. 12, two of the ring segments 40 are provided with radial end faces and two other segments 41 and 42 are provided with radial faces at one end and with inclined faces at their opposite ends which abut in a plane inclined to the axis of the core to provide a ring breaking joint. At their radial end faces the ring segments are provided with webs 43 which bridge the space between the inner portion of the inwardly projecting flange and the inner edge of the cylindrical peripheral portion of the ring. At each of the radial joints the web 43 of one segment is provided with an integral socket member 44 and the web 43 of the adjacent segment is provided with an integral pin 45 which projects into the socket 44. At the breaking joint the segment 42 is provided with a web 46 and the segment 41 is provided with a web 47. The webs 46 and 47 bridge the space between the inner edge of the cylindrical portion of the ring and the inner end of the inwardly projecting flange. The web 46 is provided with an inclined face having a groove 48 which houses a latch member 49 carried by a shaft 50 journalled in the web, the latch member 49 being movable from the position wholly within the groove 48 to a position in which it projects into a groove 51 in the inclined face of the web 47. The shaft 50 is provided with a handle 52 by means of which it may be turned. The pin and socket connection at the radial joints positively lock the segments together when the ring is assembled and the latch member 49 is in locking position but permits removal of the segments after the segment 42 has been removed.

Having thus declared the purpose and disclosed the features of my invention, what I claim is:

1. A drum type tire building core comprising a central segmental collapsible band having a substantially cylindrical exterior peripheral face and independently collapsible side rings each having a peripheral face substantially flush with the peripheral face of the central band, and inner marginal edge portions underlying the central band.

2. A tire building core of the drum type having a substantially cylindrical periphery comprising a central collapsible band having a substantially cylindrical external face and internal grooves adjacent its opposite edges, side rings each having a cylindrical external face portion of substantially the same diameter as the external face of the band and a rib along the inner edge thereof, adapted to fit in one of said grooves, each ring having a reentrant face portion for positioning a tire bead inwardly of the side edges of the cylindrical portion of the drum.

3. A drum type tire building core comprising a central segmental collapsible band, and independently collapsible side rings engaging the interior of said central band, each of said side rings comprising segments abutting end to end, two abutting ends of the segments of each ring being disposed at an inclination to the axis of the core, the other abutting ends being disposed substantially in radial planes, and interlocking elements at the abutting ends of the ring segments for holding the segments against relative lateral movements, the interlocking elements at the abutting inclined segment ends being releasable to permit removal of ring segments.

4. In a tire building core, a collapsible ring comprising a series of segments abutting end to end, the abutting end faces of two adjoining segments being inclined to the axis of the ring, the other abutting end faces being disposed substantially in radial planes, means for locking the abutting radial faces against relative lateral movements of the ring segments, and releasable means for holding said inclined abutting faces against relative movements.

5. In a tire building core, a collapsible ring comprising a series of segments abutting end to end, the abutting end faces of two adjoining segments being inclined to the axis of the ring, the other abutting end faces being disposed substantially in radial planes, interlocking means for said radial abutting faces, and a manually operable latch interlocking said inclined abutting faces.

6. A tire-band building drum comprising a collapsible, segmental, substantially cylindrical drum body, and a pair of undercut bead-seating rings removably mounted in the ends of said body and forming the substantially cylindrical end portions of the outer periphery of the drum, said rings being composed of segments and inwardly collapsible for removal from the drum body.

7. A tire-building form comprising a radially-collapsible, segmental form body, and a bead-seating ring detachably mounted thereon and composed of segments separably connected in series, and detachable from the form body by an inward radial movement.

8. A drum type tire building core comprising a central segmental collapsible band having a substantially cylindrical exterior peripheral face and independently collapsible side rings, each having a peripheral face substantially flush with the peripheral face of the central band, and inner marginal edge portions underlying the central band, and each ring having an inwardly extending tire bead positioning portion and said collapsible band being narrow enough to pass readily between the beads of a tire on the core after the removal of said side rings.

EMIL F. SCHNEDAREK.